United States Patent
Hegarty et al.

(10) Patent No.: US 10,120,777 B1
(45) Date of Patent: Nov. 6, 2018

(54) REMEDIATING SERIALIZATION INCOMPATIBILITIES

(71) Applicant: Oracle International Corporation, Redwood Shores, CA (US)

(72) Inventors: Chris Hegarty, Dublin (IE); Alan Bateman, Dublin (IE)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/719,857

(22) Filed: Sep. 29, 2017

(51) Int. Cl.
*G06F 11/36* (2006.01)

(52) U.S. Cl.
CPC ...... *G06F 11/3612* (2013.01); *G06F 11/3604* (2013.01); *G06F 11/3608* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,298,353 | B1 * | 10/2001 | Apte | G06F 8/71 |
| 2003/0101381 | A1 * | 5/2003 | Mateev | G06F 21/53 |
| | | | | 714/38.14 |
| 2005/0262512 | A1 * | 11/2005 | Schmidt | G06F 9/465 |
| | | | | 719/310 |
| 2007/0162574 | A1 * | 7/2007 | Williamson | G06F 21/31 |
| | | | | 709/220 |
| 2008/0134207 | A1 * | 6/2008 | Chamieh | G06F 9/4428 |
| | | | | 719/315 |
| 2011/0271251 | A1 * | 11/2011 | Buckley | G06F 21/629 |
| | | | | 717/120 |
| 2013/0117326 | A1 * | 5/2013 | De Smet | G06F 9/4488 |
| | | | | 707/798 |
| 2017/0063874 | A1 * | 3/2017 | Buckley | H04L 63/105 |
| 2017/0286065 | A1 * | 10/2017 | Zhou | G06F 9/449 |

OTHER PUBLICATIONS

Trobach, Florian. First steps with Java 9 and Project Jigsaw—Part 1(https://blog.codecentric.de/en/2015/11/first-steps-withjavaS-jigsaw-part-1/), Nov. 24, 2015.*

* cited by examiner

*Primary Examiner* — Viva Miller
(74) *Attorney, Agent, or Firm* — Invoke

(57) ABSTRACT

Techniques for remediating serialization incompatibilities are disclosed. A runtime environment of a module system identifies a first serializable runtime object comprising a reference to a second serializable runtime object. The first serializable runtime object is an instantiation of a first element in a first package of the module system. The first package is open to one or more reflective operations. Based on determining that (a) the second serializable runtime object is an instantiation of a second element in a second package of the module system and (b) the second element is not open to the one or more reflective operations, a remedial operation, associated with the first serializable runtime object, is executed.

20 Claims, 10 Drawing Sheets

FIG. 6
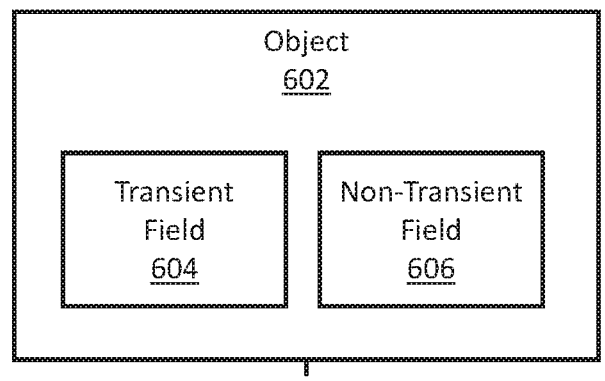
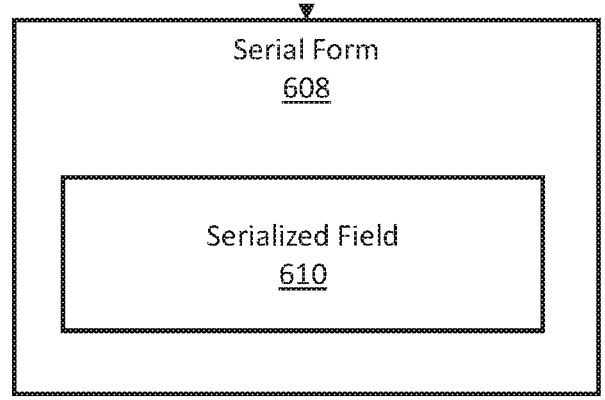
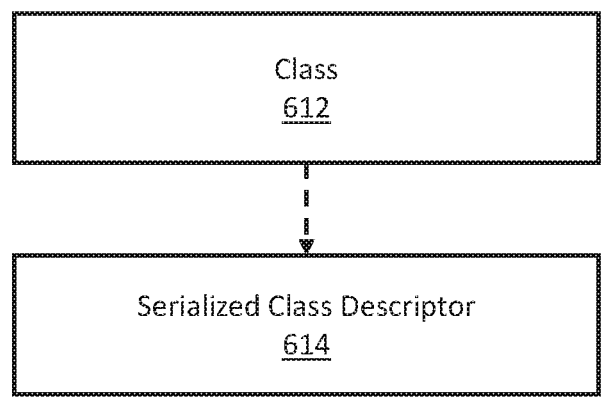

REMEDIATING SERIALIZATION INCOMPATIBILITIES

TECHNICAL FIELD

The present disclosure relates to serialization. In particular, the present disclosure relates to serialization of module elements.

BACKGROUND

Serialization is the process of generating a form (the "serial" or "serialized" form) of a runtime object that can be stored in a file, database, or some other location. The runtime object may later be reconstructed ("deserialized") based on the serial form. A particular object to be serialized may include one or more transient fields and/or one or more non-transient fields. A transient field is a field for which, if the object is serialized, a value will not be included in a serial form of the object. A non-transient field is a field for which, if the object is serialized, a value will be included in a serial form of the object. Some objects in a system may not support serialization. For example, serializing an object may require access to the object via reflective operations. Reflective operations examine the runtime object to identify its class, fields, field values, etc. If an object is not open to reflective operations, serialization of that object may be prohibited. If a non-transient field of a serializable runtime object (the "referencing object") references another object (the "referenced object") that is not open to reflective operations, then attempting to serializing the referencing object may lead to runtime errors and/or unpredictable system behavior. For example, serialization of the referencing object may fail, resulting in data loss and/or unexpected termination of a process that relies on the object.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 illustrates examples of serialization according to an embodiment;

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
2.1 EXAMPLE CLASS FILE STRUCTURE
2.2 EXAMPLE VIRTUAL MACHINE ARCHITECTURE
2.3 LOADING, LINKING, AND INITIALIZING
2.4 MODULE AND NON-MODULE ENVIRONMENTS
3. SERIALIZATION
4. REMEDIATING SERIALIZATION INCOMPATIBILITIES
5. ILLUSTRATIVE EXAMPLE
6. MISCELLANEOUS; EXTENSIONS
7. HARDWARE OVERVIEW
8. COMPUTER NETWORKS AND CLOUD NETWORKS
9. MICROSERVICE APPLICATIONS

1. General Overview

One or more embodiments include techniques for remediating serialization incompatibilities. A runtime environment of a module system identifies a first serializable runtime object that includes a reference to a second serializable runtime object. The first serializable runtime object is an instantiation of a first element in a first package of the module system. The first package is open to one or more reflective operations. Responsive to determining that (a) the second serializable runtime object is an instantiation of a second element in a second package of the module system, and (b) the second element is not open to the one or more reflective operations, a remedial operation, associated with the first serializable runtime object, is executed.

Many different kinds of remedial operations may be performed. For example, the second serializable runtime object may have a different concrete type than its declared type. A serial form of the second serializable runtime object may be emitted of the declared type. As another example, a serial form of the second serializable runtime object may be emitted of an ancestor type of the declared and/or concrete type. As another example, the module system may refrain from emitting any serial form of the second serializable runtime object. As another example, a serial form of the first serializable runtime object may be emitted in which a reference to the second serializable runtime object is replaced with a null reference. As another example, the second package may be opened to the one or more reflective operations. As another example, a minimal serialized form of the second serializable runtime object may be emitted. As another example, an exception or warning may be generated.

One or more embodiments described in this Specification and/or recited in the claims may not be included in this General Overview section.

2. Architectural Overview

Figure 1:
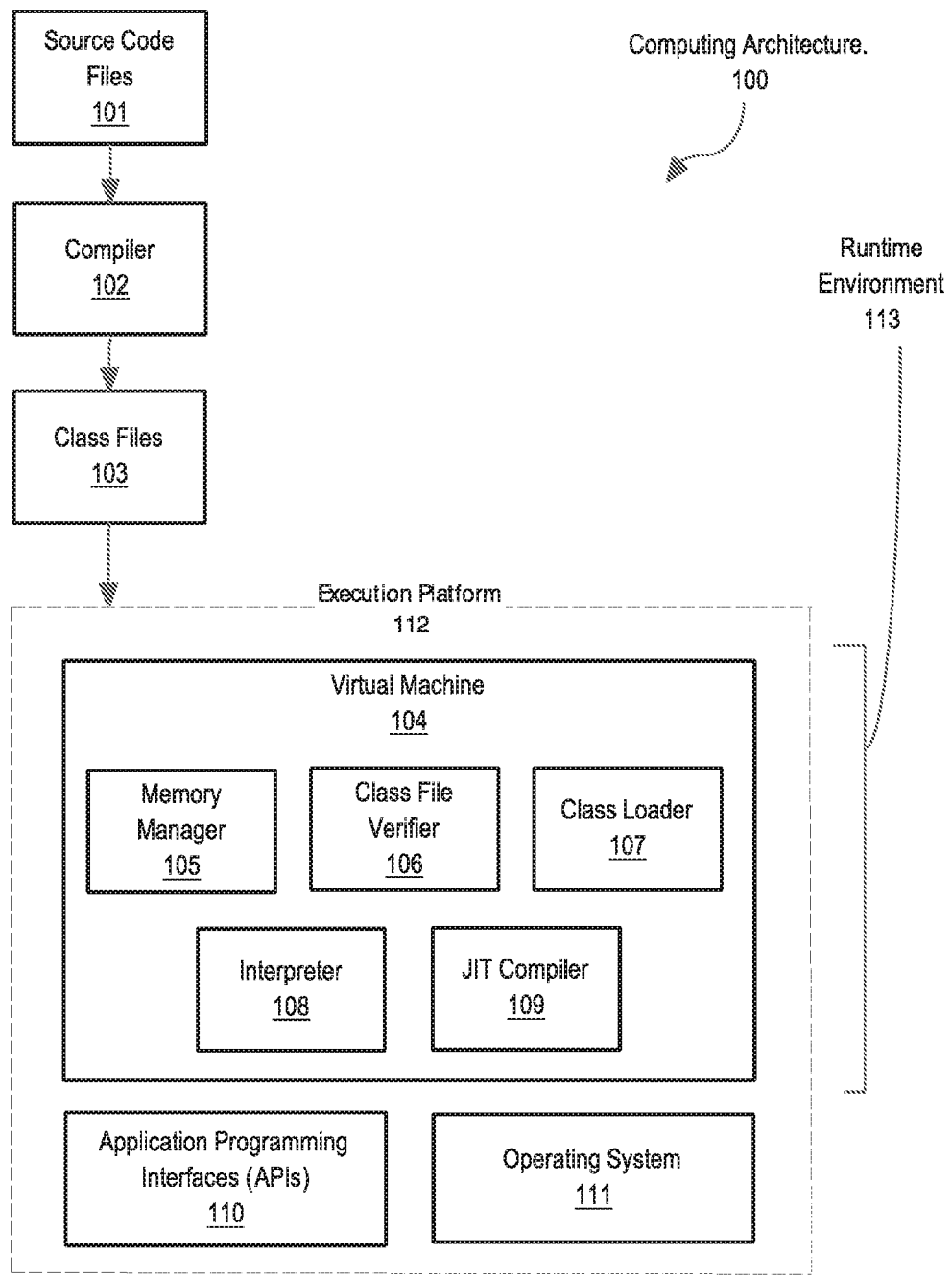
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
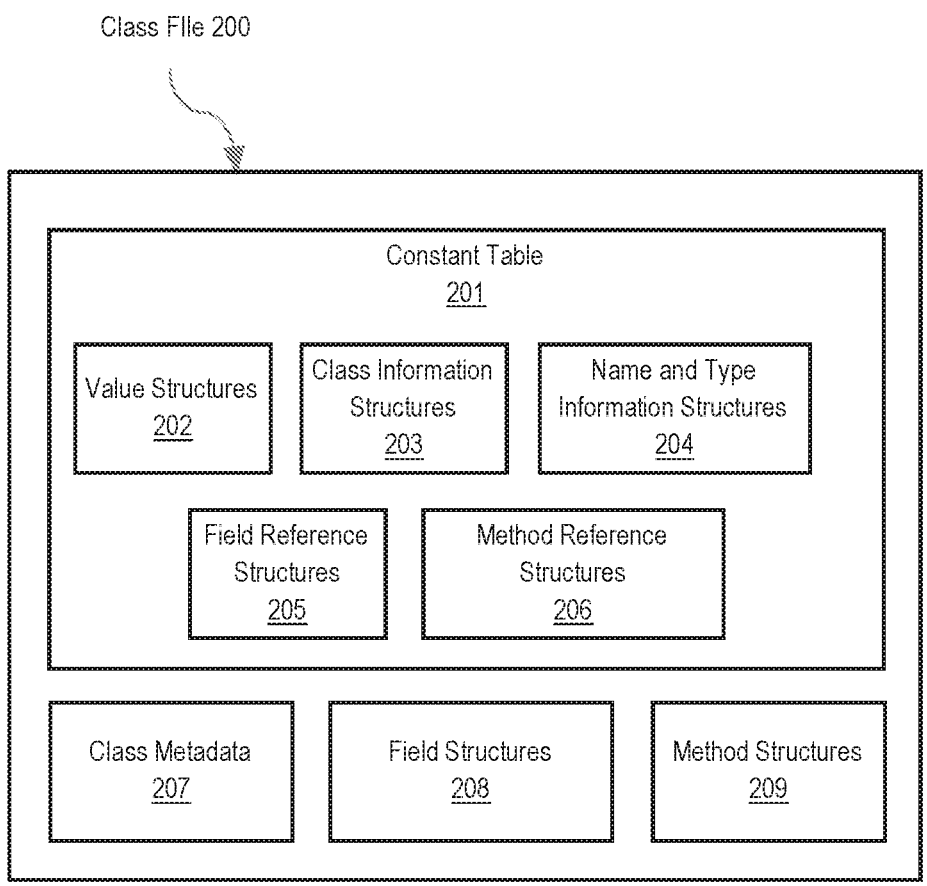
FIG. 2 is a block diagram illustrating an embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

class A
{
int add12and13( ){
   return B.addTwo(12, 13);
}
}

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
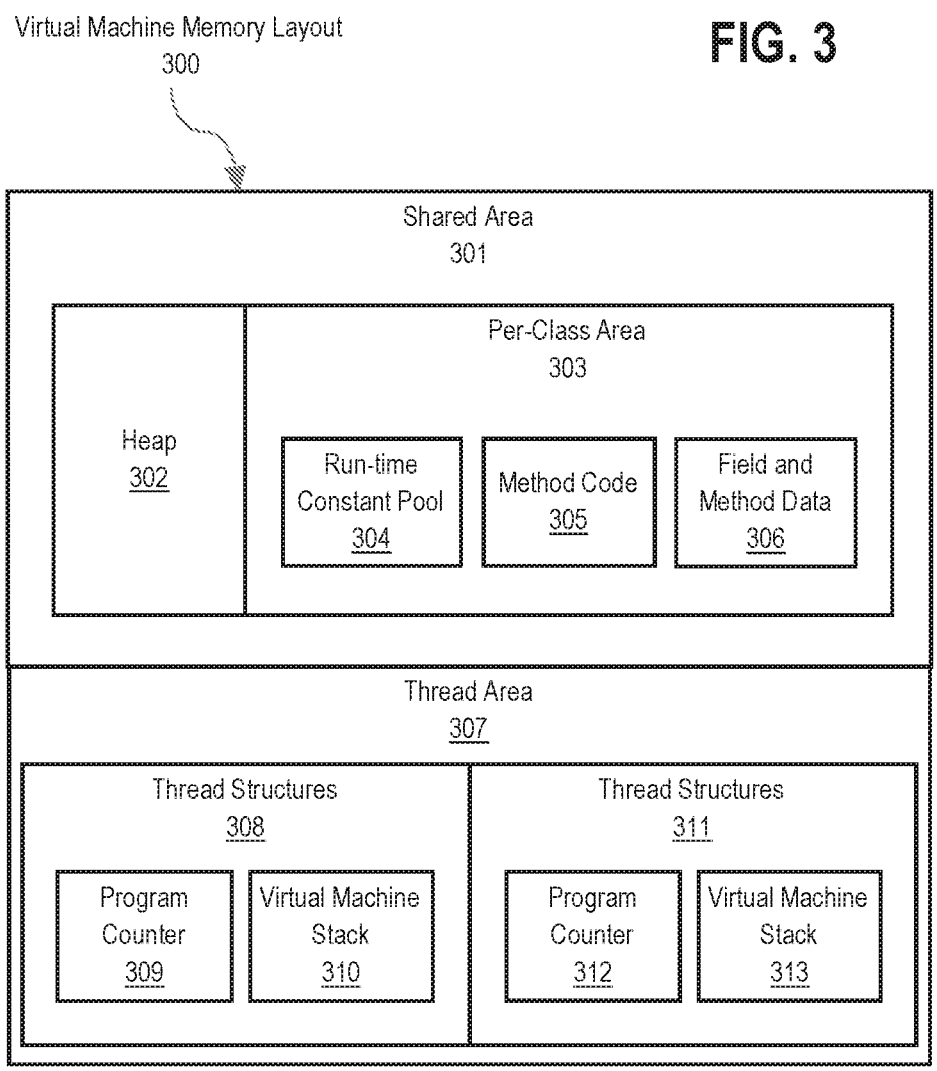
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
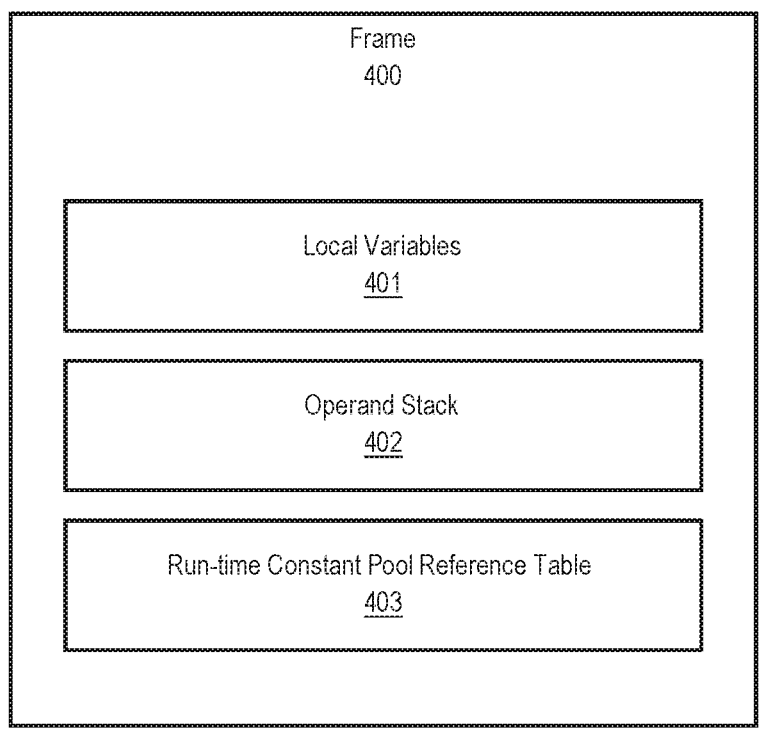
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

2.4 Module and Non-Module Environments

Computing platforms for developing and maintaining software generally rely on one of two kinds of systems: non-module systems and module systems.

A non-module system refers to a system in which dependencies between different pieces of code are not strictly declared or restricted. An industry-defined term "JAR hell" refers to example uses of Java Archive (JAR) files in a non-module system which result in problems, for example, with the class loading process.

A module system includes a collection of named modules and defines how the collection of named modules work together. Each particular named module in the collection of named modules may explicitly define dependencies on other named modules (or the contents thereof). However, named modules are typically restricted from explicitly depending on any non-module code.

Figure 5:
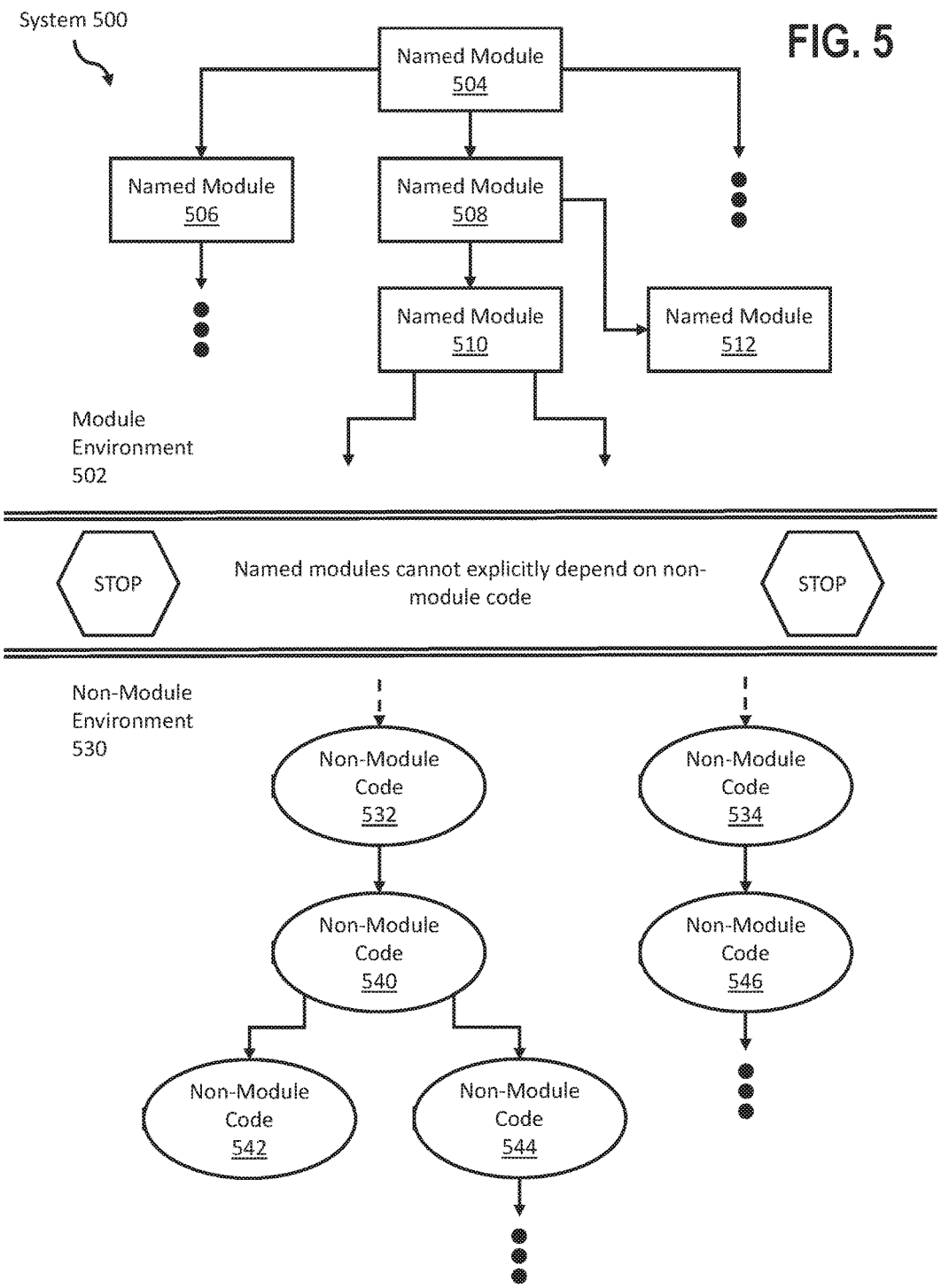
FIG. 5 illustrates named modules in a module environment and non-module code in a non-module environment.

FIG. 5 illustrates examples of systems in accordance with one or more embodiments. Other embodiments may include more or fewer devices and more or fewer components than illustrated in the systems and/or described below. Hardware components, software components, and/or functionality described as corresponding to one device may instead correspond to another device. Components illustrated separately may be combined into a single component or implemented on a single device. Accordingly, the scope of the claims should not be construed as being limited by the specific examples herein.

As illustrated in FIG. 5, a system 500 includes components of a module environment 502 and components of a non-module environment 530. The non-module environment 530 includes non-module code 532-546. Dependencies between different non-module code are not required to be explicitly declared. Accordingly, when a first non-module code depends on a second non-module code, the software development environment must search for the second non-module code in all files of a set of files associated with all of the code. The dependencies between different non-module code (which may not be explicitly declared) are illustrated in FIG. 5 using arrows. For example, the dependency of non-module code 532 on non-module code 540 is illustrated using an arrow beginning at non-module code 532 and ending at non-module code 540. Furthermore, a dependency of non-module code 540 on non-module code 542 and non-module code 544 is illustrated using two arrows beginning at non-module code 540 and ending at non-module code 542 and non-module code 544, respectively.

The module environment 502 includes a set of named modules (e.g., named modules 504-512). Dependencies between different named modules in a module environment, such as module environment 502, are explicitly declared by the modules. An explicitly declared dependency may be referred to herein as an "explicit dependency." The explicit dependencies between different named modules (or contents thereof) in module environment 502 are also illustrated using arrows. For example, the explicit dependency of named module 504 on named module 508 is illustrated using an arrow starting at named module 504 and ending at named module 508. Further, the explicit dependency of named module 508 on named module 510 is illustrated using an arrow starting at named module 508 and ending at named module 510.

As illustrated in FIG. 5, there is a partition between module environment 502 and non-module environment 530. Specifically, named modules cannot explicitly depend on non-module code. For example, named module 510 cannot explicitly depend on non-module code 532. As a result, module environments comprising named modules cannot be built on top of non-module environments comprising non-module code.

In the Java Module System, a keyword "requires" is used to declare explicit dependencies. The keyword "requires" may be used with a parameter identifying another component or identifying a dependency path (e.g., CLASSPATH). An explicit dependency on a dependency path allows for depending on the parameters associated with the dependency path. In an example, a first component depends on a second component, either directly or via a dependency path. In addition, the ability of a first module to access particular module code and/or resources in a second module may be contingent on the second module exposing the particular module code and/or resources to the first module. For example, the second module may include two packages. The second module may expose one of the packages to the first module, but not the other package. In this example, the first module may be able to access code and/or resources in the exposed package, but not in the non-exposed package. In the Java Module System, an "exports" keyword may be used to expose module elements to other modules. Alternatively or in addition, a module element may be considered exposed if it is open to reflective operations at runtime. In other words, a package may be considered "open," even if it is not also "exported," if another module (i.e., other than the module containing the package) has been granted access to access code and/or resources in the package via reflective operations. In a Java environment, a package may be opened to reflective operations using an "opens" keyword.

3. Serialization

FIG. 6 illustrates examples of serialization according to an embodiment. FIG. 6 is provided for exemplary purposes only and should not be construed as limiting one or more embodiments. As shown in FIG. 6, an object 602 may include one or more fields. A field is a variable to which a value may be assigned. In this example, the object 602 includes a transient field 604 and a non-transient field 606. A transient field 604 is a field for which, if the object 602 is serialized, a value will not be included in (also referred to as "emitted to," "written to," etc.) the serial form 608 of the object 602. In a Java environment, a field may be declared as transient using the "transient" keyword. In the following example, if a value is assigned to the "password" field, that value will not be included in a serial form of the object containing the field:

String username;
transient String password;

A non-transient field 606 is a field for which, if the object 602 is serialized, a value will be emitted to the serial form 608 of the object 602.

When the object 602 is serialized, a serial form 608 of the object 602 is generated. The serial form 608 includes information that allows the object 602 (excluding values of any transient fields) to be reconstructed. For example, the serial form 608 of the object 602 includes a serialized field 610, i.e., a serial form of the non-transient field 606.

When an object (e.g., object 602) is serialized, additional information supportive of deserialization may also be generated. For example, as illustrated in FIG. 6, a class 612 corresponds to a type of the object 602. Based on the class 612, a serialized class descriptor 614, i.e., a serial form of the class 612, may be generated.

In an embodiment, serialization of a runtime object is performed using reflective operations, i.e., operations that examine the runtime object to identify its class, fields, field values, etc. Reflective operations may require that the object in question be open to reflective operations. In a Java environment, a module may open packages (and the object types included in those packages) to reflection using an "opens" keyword. Whether or not a runtime object is theoretically serializable, serialization of that object may be prohibited if the package that includes the object's type is not opened to reflective operations.

A serializable runtime object (referred to for ease of discussion as the "referencing object") may include a non-transient field that references another serializable runtime object (referred to for ease of discussion as the "referenced object"). If the referencing object is serialized, it is expected that the value of the non-transient field also will be serialized. That is, the referenced object also will be serialized. However, the package that includes the referenced object's type may not be open to reflective operations. Attempting to serializing the referencing object in this situation may lead to runtime errors and/or unpredictable system behavior. For example, serialization of the referencing object may fail, resulting in data loss and/or unexpected termination of a process that relies on the object.

4. Remediating Serialization Incompatibilities

Figure 7:
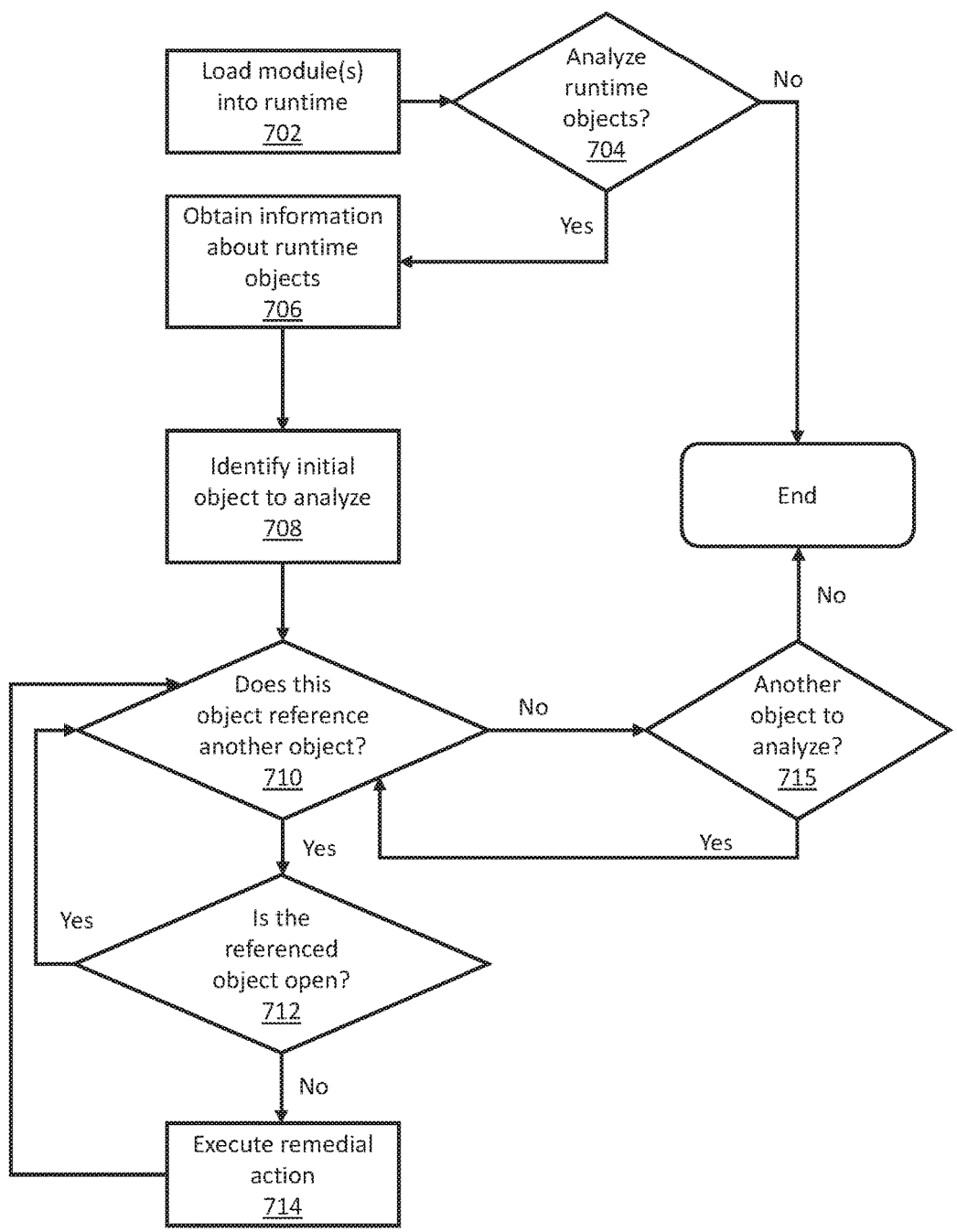
FIG. 7 illustrates a set of operations for remediating serialization incompatibilities in accordance with one or more embodiments.

As noted above, serialization of a runtime object may fail if a non-transient field of the runtime object references another object whose type is not open to reflective operations. For purposes of this discussion, this situation may be referred to as a "serialization incompatibility." FIG. 7 illustrates a set of operations for remediating serialization incompatibilities in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments. The following discussion refers to a runtime system performing various operations. For purposes of this discussion, the runtime system may refer to any process that is capable of analyzing runtime objects, such as the module system itself, a diagnostic tool operating on the module system, an integrated development environment (IDE) capable of emulating a runtime, or any other process used to analyze runtime objects for serialization incompatibilities.

In an embodiment, a module system loads modules into a runtime environment (Operation 702). In a Java environment, the "java" command may be used to load modules into a Java runtime environment, with the "-m" option identifying the main module. At some point before or during module loading, a runtime system performs an analysis on the module code to identify potential serialization incompatibilities. Specifically, the runtime system may perform the analysis to determine whether any types that are open to reflective operations include fields that are declared as types that are not open to reflective operations. This analysis may be referred to as a "static" analysis because it relies on module code—specifically, the field types declared in the module code. Static analysis is described in further detail in U.S. patent application Ser. No. 15/073,548, titled "Modular Serialization," filed Mar. 17, 2016 and incorporated herein by reference. Alternatively, static analysis may not be performed. In an embodiment, static analysis involves generating a module dependency graph and traversing the graph to analyze code in the modules for serialization incompatibilities.

In an embodiment, static analysis is insufficient to identify all serialization incompatibilities. For example, a set of code may declare a field of a type that is open to reflective operations and therefore passes static analysis. At runtime, an object may be assigned to the field that has a different type than the declared type. The assigned type may correspond to a subclass of the declared type, for example. The assigned type (also referred to as the object's "concrete type") may not be open to reflective operations even though the declared type is open to reflective operations. Thus, a serialization incompatibility may exist at runtime even though the module code would pass static analysis. In some cases, the fact that an object is of a type that is not open to reflective operations may not be immediately apparent from the type's source code. For example, the type may subclass or extend from another type that is not open to reflective operations. Many different kinds of situations may arise in which an object's type is not open to reflective operations. In an embodiment, performing an analysis for serialization incompatibilities at runtime allows the runtime system to identify the concrete types of objects assigned to fields.

In an embodiment, the runtime system determines whether to analyze runtime objects for serialization incompatibilities (Operation 704). The runtime system may determine whether to analyze runtime objects for serialization compatibilities in many different ways. As an example, the runtime system receives a command to serialize one or more runtime objects. The command may be part of a runtime serialization library. In response to receiving the command, the runtime system initiates an analysis of runtime objects for serialization incompatibilities. As another example, the runtime system determines that a specific argument, setting, or instruction was supplied to the module system (e.g., "java-m"). The argument, setting, or instruction directs the runtime environment to use a debugging mode in which runtime objects are analyzed for serialization incompatibilities. The argument, setting, or instruction may be a default setting that applies whenever modules are present in the runtime system. As another example, the runtime system receives user input, at runtime, directing the runtime system to analyze runtime objects for serialization incompatibilities. Upon receiving the user input, the runtime system initiates an analysis of runtime objects for serialization incompatibilities. If the runtime system determines that no runtime analysis of objects for serialization incompatibilities will be performed, then the operations of FIG. 7 end without performing the analysis.

One or more embodiments involve obtaining information about runtime objects (Operation 706). Specifically, the runtime system obtains information about object instances that are present in the runtime environment and values assigned to the runtime objects' respective fields. For example, the runtime environment may obtain information about runtime objects by executing a heap dump to obtain a representation of the memory state of the runtime system at the time the heap dump was executed. In other words, a heap dump may be considered a snapshot of the objects in memory at the time of the heap dump. Using a heap dump allows the runtime system to perform the analysis on a fixed snapshot of a system state, in which the values assigned to fields do not change during the course of the analysis. However, it should be appreciated that the efficacy of a runtime analysis depends on the runtime conditions at the time of the analysis. A field assignment resulting in a serialization incompatibility may occur after the runtime system has performed an analysis of a particular heap dump. Accordingly, the runtime system may analyze runtime objects for serialization incompatibilities multiple times, allowing for changes in system state over time. For example, the runtime system may execute and analyze heap dumps at various intervals during runtime, or upon encountering predefined trigger conditions. Performing the analysis multiple times may increase the likelihood of identifying runtime conditions that give rise to serialization incompatibilities.

In an embodiment, the runtime system identifies an initial object as a current object to analyze for serialization incompatibilities (Operation 708). For example, the runtime system may examine a heap dump to determine whether it contains any representations of runtime objects. The runtime system may select a runtime object at random for analysis, or may traverse a graph of runtime objects from a particular starting point.

In an embodiment, only certain kinds of objects are subject to analysis for serialization incompatibilities. Other kinds of objects may not be subject to analysis. For example, objects of types belonging to a system library (e.g., java.* in a Java environment) may not be subject to analysis. Alternatively or in addition, once an object has already been analyzed, it may be marked as such and not subject to further analysis. Alternatively or in addition, only objects that are serializable may be considered. For example, in a Java environment, only objects of types that implement or have a superinterface of "java.io. Serializable" may be considered for analysis. Alternatively or in addition, only objects of types in packages that are exposed to and/or referenced by code in other modules may be considered for analysis. In general, the analysis may be restricted to objects that are (or may be) referenced by one or more other objects from different modules. Alternatively or in addition, the analysis may bypass any objects with alternative serial forms. In a Java environment, an object has an alternative serial form if its type implements the "writeReplace( )" method or overrides the "writeObject( )" method. Alternatively or in addition, the analysis may bypass any objects of a type whose serial form is defined by the serialization library. In a Java environment, these types include, for example, "Enum," "String," "Class," etc.

In an embodiment, the runtime system determines whether the current object being analyzed references another object (Operation 710). Determining whether the current object being analyzed references another object may involve determining whether any fields of the current object have values corresponding to other runtime objects. The runtime system may obtain information about an object's field names and corresponding declared types from a serial form of the object's class descriptor. As an example, the runtime system is currently analyzing an object x. Object x has a field f. Other object y has been assigned to f. In other words, the value of field f is object y. In this example, object x references object y. For purpose of this discussion, the object currently being analyzed may be referred to as the "referencing object" (e.g., object x in the example above) and the object referenced by the current object may be referred to as the "referenced object" (e.g., object y in the example above). In an embodiment, only objects assigned as values of non-transient fields are considered, because the system will not attempt to serialize objects assigned as values of transient fields. Analyzing objects for serialization incompatibilities may be performed recursively. For example, if a current object x references another object y, then object y may also be analyzed for serialization incompatibilities. If object y in turn references another object z, then object z may also be analyzed for serialization incompatibilities.

In an embodiment, if the referencing object does not reference any objects, or if all referenced objects have already been examined, the runtime system determines whether there are any other runtime objects to analyze (Operation 715). If there are no more runtime objects to analyze, then the process of analyzing for serialization incompatibilities ends. If the runtime system does identify another runtime object to analyze, then the analysis is repeated for that object (Operation 710).

In an embodiment, if the current object being analyzed does reference another object (i.e., as determined in Operation 710), then the runtime system determines whether the referenced object is open to reflective operations (Operation 712). Whether or not an object is open to reflective operations may depend on whether the package that includes the object's type is open to reflective operations. If the referenced object is open to reflective operations, then no serialization incompatibility is identified. The runtime system may then determine whether the referencing object references any other objects (i.e., returning to Operation 710).

In an embodiment, if the referenced object is not open to reflective operations, then a serialization incompatibility exists. Specifically, the fact that a non-transient field references a non-open object means that the referring object cannot be serialized properly. Accordingly, in an embodiment, the runtime system performs a remedial operation (Operation 714). Specifically, the remedial operation is performed with respect to the referring object, so that the referring object may be serialized. Alternatively or in addition, the fact that a referenced object is not open to reflective operations may not preclude serialization in every situation. In an example, the referenced object is an instance of a public class. The public class is in a package that is exposed to the module that includes the referring object's type. All members of the class are public. In this example, even if the referenced object's class is not explicitly open to reflective operations, serialization may nonetheless be allowed.

Figure 8:
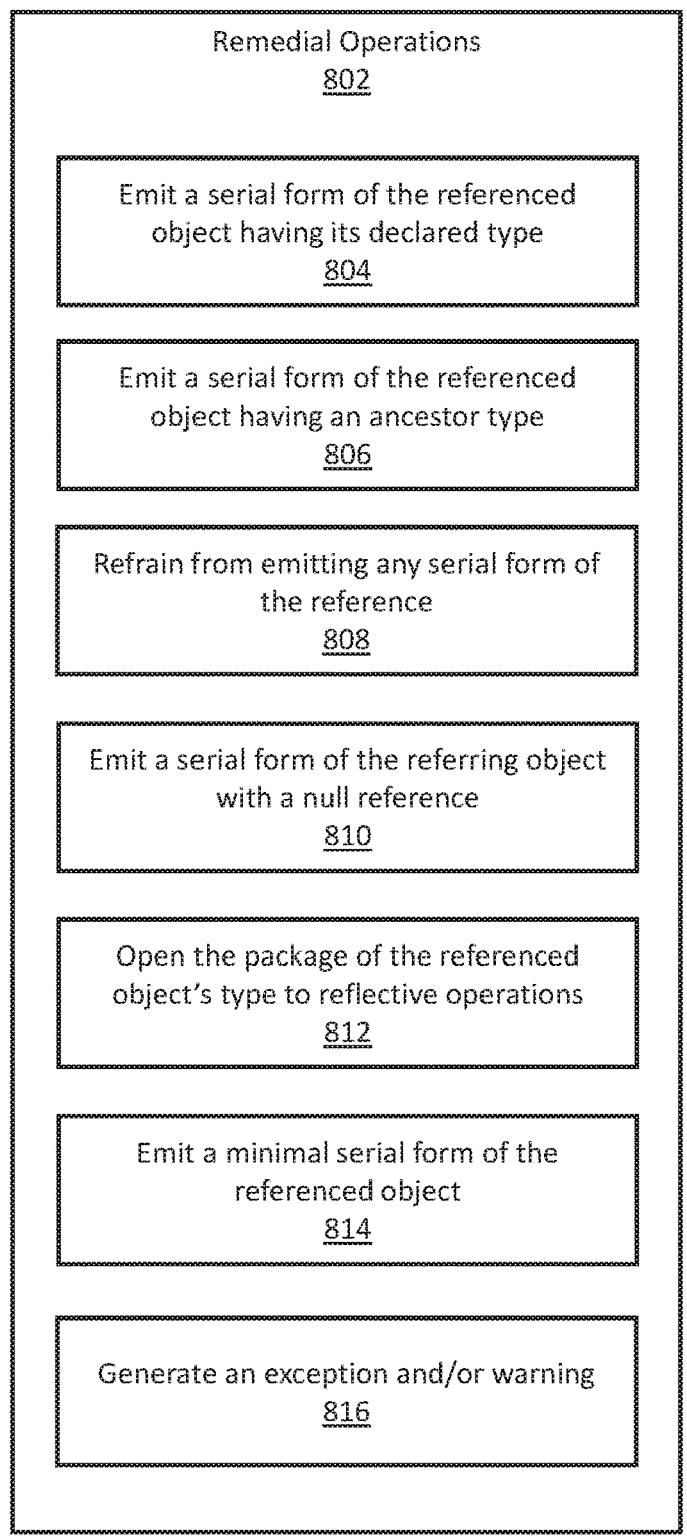
FIG. 8 illustrates remedial operations in accordance with one or more embodiments.

FIG. 8 illustrates remedial operations 802 in accordance with one or more embodiments. In an embodiment, one or more of the remedial operations 802 illustrated in FIG. 8 is/are used to address serialization incompatibilities. In other words, a particular runtime system may support only a subset of the remedial operations 802 illustrated in FIG. 8. Alternatively or in addition, a particular runtime system may support one or more remedial operations not illustrated in FIG. 8. Accordingly, the specific remedial operations 802 illustrated in FIG. 8 should not be construed as limiting one or more embodiments.

As discussed above, a field may be declared with a particular type, but an object of a different concrete type (e.g., corresponding to a subclass) may be assigned to the field at runtime. The concrete type may not be open to reflective operations even if the declared type is open to reflective operations. Accordingly, a serial form of the referenced object is emitted that is of the declared type. This serial form of the referenced object is emitted in the serial form of the referring object (Operation 804). By casting the referenced object as the declared type, which is open to reflective operations, the serialization incompatibility may be eliminated. However, casting an object to a different type may result in the loss of information that is specific to the concrete type. For example, a "Vehicle" class may have a subclass of "Airplane." The "Airplane" type may include a "maxAirspeed" field that is not included in the "Vehicle" superclass. Casting a runtime object of type "Airplane" as type "Vehicle" may result in omitting, from the object's serial form, the "maxAirspeed" field and any value assigned to that field.

In an embodiment, a serial form of the referenced object is emitted that has an "ancestor type" of the referenced object's concrete type. This serial form is emitted into the serial form of the referring object (Operation 806). For the purposes of this discussion, the "ancestor type" is the type of the closest ancestor (i.e., superclass, interface, or any other type from which the referenced object may inherit properties) that is open to reflective operations. For example, an object's concrete type "C" may not be open to reflective operations. An immediate superclass "B" of "C" may also not be open to reflective operations. However, the superclass "B" may implement an interface "A" that is open to reflective operations. In this example, a serial form of the referenced object of type "A" may be emitted into the serial form of the referencing object. The ancestor type identified in this manner may be identical to the field's declared type, or may be different. For example, the ancestor type may be a subclass of the declared type. As noted above, data loss may occur if an object is cast as a different type, such as an ancestor type.

In an embodiment, in the serial form of the referencing object, the system refrains from emitting any serial form of the reference (Operation 808). The entire field may be omitted from the serial form, or the field's value may be left empty. In an embodiment, refraining from emitting a serial form of the reference has the same effect as making the field transient. Alternatively, in the serial form of the referencing object, a null value may be emitted in place of the reference (Operation 810). For example, in a Java environment, a serial form of the "null" literal may be emitted.

In an embodiment, to address a serialization incompatibility, the runtime system opens the package that includes the referenced object's type to reflective operations (Operation 812). Opening the package to reflective operations allows for a serial form of the referenced object to be emitted in the serial form of the referencing object. However, opening the package for reflective operations may also yield security concerns, because other code may then be able to reflect over types in that package. To help limit security concerns, the package may be opened for reflective operations only for the purpose of serialization. Alternatively or in addition, a "qualified open" may be used, whereby the package is opened only to reflective operations performed by trusted code, such as serialization code in the system library.

In an embodiment, in the serial form of the referencing object, a minimal serial form of the referenced object may be emitted (Operation 814). As an extreme example, the minimal serial form of the referenced object may be equivalent to casting the object as type "object." As another example, the minimal serial form may include all fields that are inherited from one or more ancestor types that are open to reflective operations, while omitting the serial forms of any fields that are (a) specific to the object's concrete type or (b) inherited from an ancestor type that also is not open to reflective operations. Thus, the minimal serial type may be thought of as a hybrid of the concrete type and one or more ancestor type(s), in which one or more fields of the concrete type may be lost. The minimal serial form of the referenced object may still be identified as being of the concrete type, or may have a different type (e.g., "Minimal" or "Hybrid") indicating that a minimal serial form has been used.

In an embodiment, to address a serialization incompatibility, an exception and/or warning is generated (Operation 816). An exception is a runtime event that disrupts the normal flow of operations. For example, in a Java environment, an exception is "thrown" with the expectation that it will be handled somewhere in the call stack. A warning is a message that informs a user of a problematic system condition—in this case, that a serialization incompatibility has been identified. The warning may be presented to the user on a command line, in a widget of a graphical user interface, in an error log, or by some other means. An exception may be accompanied by a warning. Many different kinds of exceptions and/or warnings may be generated.

In an embodiment, one or more remedial operations such as, but not limited to, those illustrated in FIG. 8 may help avoid consequences that would otherwise arise from serialization incompatibilities. If a serialization incompatibility is identified during serialization, the serialization may be able to proceed with minimal impact on the runtime system. If a serialization incompatibility is identified during debugging or otherwise before an actual attempt at serialization, a developer may be able to modify the module code to eliminate the serialization incompatibility. Emitting an alternative serial form of the referenced object may allow the runtime system to successfully serialize the referencing object in a manner that satisfies (using, for example, one or more approaches discussed above) the referencing object's reference to the referenced object.

5. Illustrative Example

A detailed example is described below for purposes of clarity. Components and/or operations described below should be understood as one specific example which may not be applicable to certain embodiments. Accordingly, components and/or operations described below should not be construed as limiting the scope of any of the claims.

Figure 9:
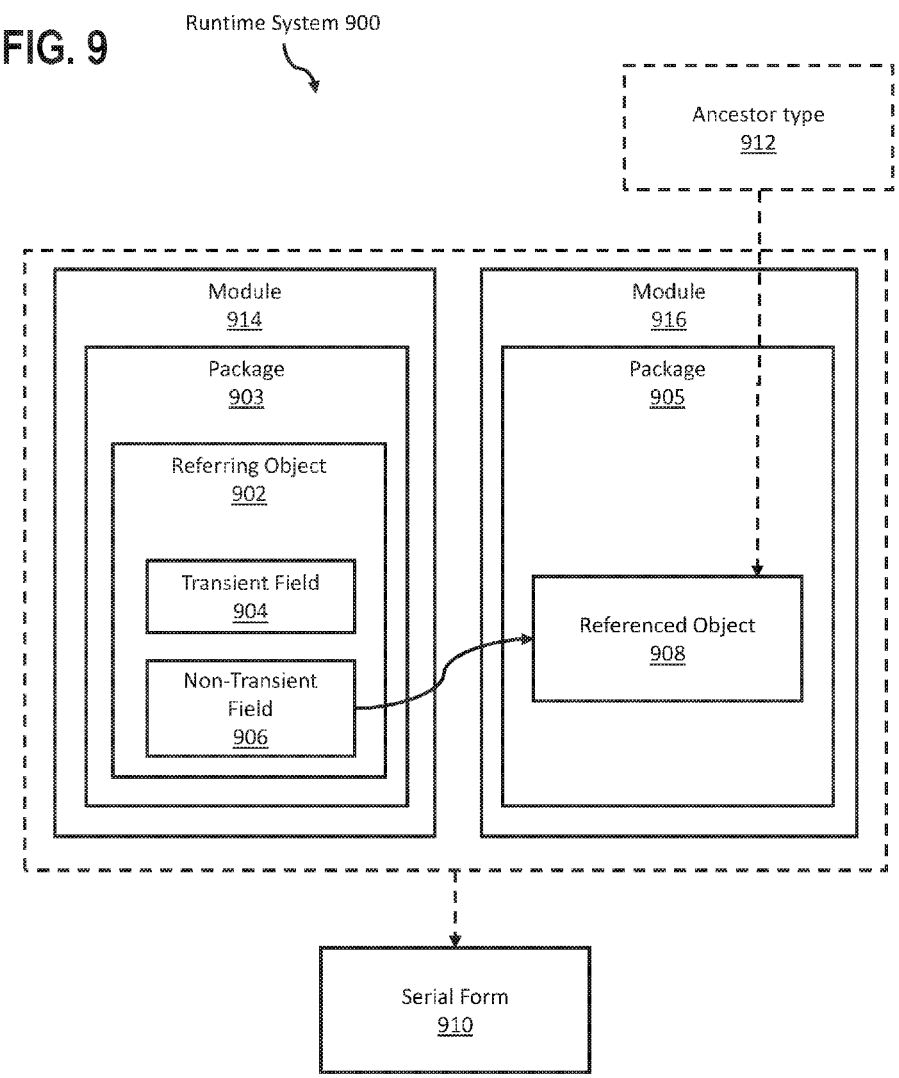
FIG. 9 illustrates an example of remediating serialization incompatibilities in accordance with one or more embodiments.

As illustrated in FIG. 9, a runtime system 900 includes a referring object 902 that references a referenced object 908. The referring object 902 is in package 903 and the referenced object is in package 905. The referenced object 908 is of a type that has an ancestor type 912. The ancestor type 912 is the most proximate ancestor type, relative to the referenced object's 908 concrete type, that is open to reflective operations. The ancestor type 912 may be in the same module 916 as package 905 or in a different module.

The referring object 902 includes a transient field 904 and a non-transient field 906. If the runtime system 900 serializes the referring object 902, a value of the transient field 904 will not be included in the serial form 910 of the referring object 902. The non-transient field references a referenced object 908. However, package 905 is not open to reflective operations. Specifically, package 905 is in a module 916 that has not opened package 905. In contrast, package 903 is in a module 914 that has opened package 903. Accordingly, the referenced object 908 is of a type that is not open to reflective operations. To serialize the referring object 902, a remedial operation must be performed.

As an example, the referenced object 908 has a concrete type that is different from its declared type. Specifically, in this example, the non-transient field 906 is declared in the class of the referring object 902 as taking assigned objects of a particular type. The type declared in the class of the referring object 902 is different from the concrete type of the referenced object 908 assigned to the non-transient field 906 at runtime. The runtime system 900 emits a serial form 910 of the referring object 902 in which a serial form of the referenced object 908 is of the declared type rather than the concrete type. As another example, an ancestor type 912 is open to reflective operations. The runtime system 900 emits a serial form of the referenced object 908 that is of the ancestor type 912 rather than the referenced object's 908 declared type or concrete type. As another example, the runtime system 900 does not emit any serial form of the referenced object 908 in the serial form 910 of the referring object 902. The runtime system 900 may instead refrain from emitting any serial form of the non-transient field 906, effectively treating the non-transient field 906 as transient. Alternatively, the runtime system 900 may emit a null value as the value of the non-transient field 906. As another example, the runtime system 900 opens package 905 to reflective operations. Opening package 905 to reflective operations means that the referenced object 908's type is open to reflective operations used in serialization. The runtime system 900 then includes a serial form of the referenced object 908 in the serial form 910 of the referencing object 906. As another example, the runtime system identifies fields that the referenced object's 908 concrete type and the ancestor type 912 have in common. Fields that the two types have in common may include, for example, fields inherited by the referenced object's 908 concrete type from the ancestor type 912. When the runtime system 900 emits a serial form 910 of the referring object 902, the serial form 910 includes a minimal serial form of the referenced object 908. The minimal serial form of the referenced object 908 includes values of the fields that the types have in common, but does not include values of any fields found only in the referenced object's 908 concrete type. As another example, as an alternative or in addition to another kind of remedial operation, the runtime system 900 throws an exception indicating that a serialization incompatibility was encountered.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 10:
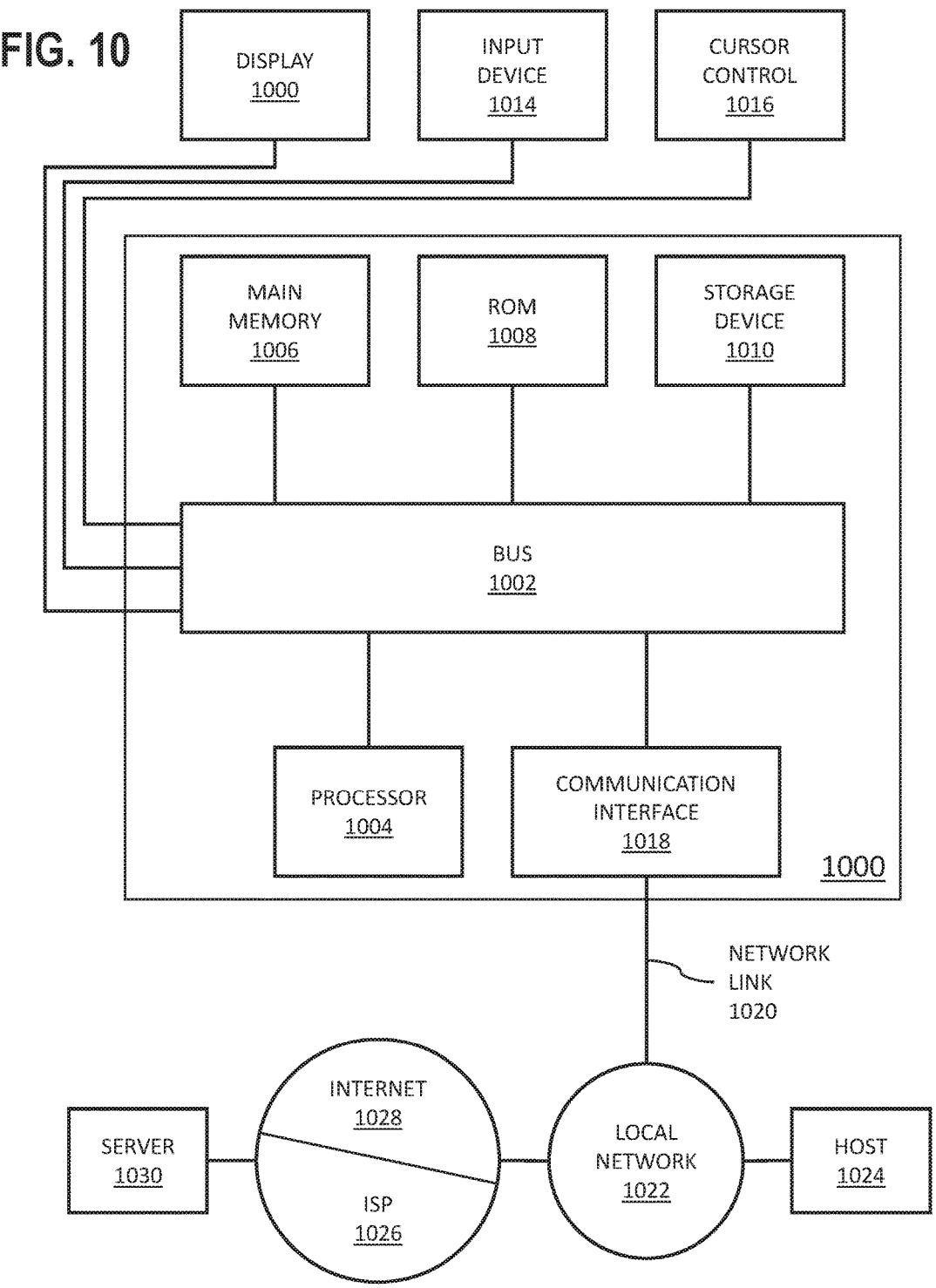
FIG. 10 shows a block diagram that illustrates a computer system in accordance with one or more embodiments.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various kinds of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

8. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:

identifying, by a runtime environment of a module system, a first serializable runtime object comprising a first reference to a second serializable runtime object;

determining that the first serializable runtime object is a first instantiation of a first element in a first package of the module system, wherein the first package is open to one or more reflective operations;

determining that (a) the second serializable runtime object is a second instantiation of a second element in a second package of the module system and (b) the second element is not open to the one or more reflective operations, wherein determining that the second element is not open to the one or more reflective operations is based, at least in part, on inter-module accessibility specified by the module system; and responsive to determining (a) and (b), and based at least in part on the first reference of the first serializable object to the second serializable runtime object, executing a remedial operation associated with the first serializable runtime object, wherein executing the remedial operation comprises one or more of (a) wherein the second serializable object has a concrete type different from a declared type of the first reference in the first serializable object: emitting a serial form of the second serializable object of the declared type, for inclusion in a serial form of the first serializable object to satisfy the first reference, (ii) wherein a closest ancestor type, of the concrete type of the second serializable object, is open to the one or more reflective operations: emitting a serial form of the second serializable object of the closest ancestor type that is open to the one or more reflective operations, for inclusion in the serial form of the first serializable object to satisfy the first reference, (iii) refraining from emitting any serial form of the first reference to the second serializable runtime object, (iv) emitting a serial form of the first reference in which the second serializable object is replaced with a null value, (v) opening the second package to the one or more reflective operations, (vi) emitting, in a first serial form of the first serializable runtime object, a minimal serial form of the second serializable runtime object, (vii) raising a runtime exception, or (viii) raising a warning.

2. The medium of claim 1, wherein the first package and the second package are in a same module of the module system.

3. The medium of claim 1, wherein the second serializable object has the concrete type different from the declared type of the first reference in the first serializable object.

4. The medium of claim 3, wherein the remedial operation comprises emitting the serial form of the second serializable object of the declared type, for inclusion in the serial form of the first serializable object to satisfy the first reference.

5. The medium of claim 1, further comprising:

determining the closest ancestor type, of the concrete type of the second serializable object, that is open to the one or more reflective operations, wherein the remedial operation comprises emitting the serial form of the second serializable object of the closest ancestor type that is open to the one or more reflective operations, for inclusion in the serial form of the first serializable object to satisfy the first reference.

6. The medium of claim 1, wherein the remedial operation comprises refraining from emitting any serial form of the first reference to the second serializable runtime object.

7. The medium of claim 1, wherein the remedial operation comprises emitting the serial form of the first reference in which the second serializable object is replaced with the null value.

8. The medium of claim 1, wherein the remedial operation comprises opening the second package to the one or more reflective operations.

9. The medium of claim 1, wherein the remedial operation comprises emitting, in the first serial form of the first serializable runtime object, the minimal serial form of the second serializable runtime object.

10. The medium of claim 9, wherein the minimal serial form of the second serializable object comprises zero or null values for all fields in the second serializable object.

11. The medium of claim 9, wherein the minimal serial form of the second serializable object comprises zero or null values for any field that is not inherited from an ancestor that is open to the one or more reflective operations.

12. The medium of claim 1, wherein the remedial operation comprises raising the runtime exception.

13. The medium of claim 1, wherein the remedial operation comprises raising the warning.

14. The medium of claim 1, wherein the runtime environment comprises a simulated runtime in an integrated development environment (IDE).

15. The medium of claim 1, wherein identifying the first serializable object and the second serializable object comprises generating a heap dump.

16. The medium of claim 1, wherein executing the remedial operation is also responsive to detecting a debugging mode of the runtime environment.

17. The medium of claim 1, wherein the remedial operation is executed while attempting to serialize the first serializable object.

18. The medium of claim 1, wherein identifying the first serializable object is performed while traversing an object dependency graph, wherein traversing the object dependency graph is performed, at least in part, to identify serializable objects.

19. A system comprising:
one or more hardware processors; and
one or more one or more non-transitory computer-readable media storing instructions, which when executed by the one or more hardware processors, cause execution of operations comprising:
identifying, by a runtime environment of a module system, a first serializable runtime object comprising a first reference to a second serializable runtime object;
determining that the first serializable runtime object is a first instantiation of a first element in a first package of the module system, wherein the first package is open to one or more reflective operations;
determining that (a) the second serializable runtime object is a second instantiation of a second element in a second package of the module system and (b) the second element is not open to the one or more reflective operations,
wherein determining that the second element is not open to the one or more reflective operations is based, at least in part, on inter-module accessibility specified by the module system; and
responsive to determining (a) and (b), executing a remedial operation associated with the first serializable runtime object,
wherein executing the remedial operation comprises one or more of
(i) wherein the second serializable object has a concrete type different from a declared type of the first reference in the first serializable object: emitting a serial form of the second serializable object of the declared type, for inclusion in a serial form of the first serializable object to satisfy the first reference,
(ii) wherein a closest ancestor type, of the concrete type of the second serializable object, is open to the one or more reflective operations: emitting a serial form of the second serializable object of the closest ancestor type that is open to the one or more reflective operations, for inclusion in the serial form of the first serializable object to satisfy the first reference,
(iii) refraining from emitting any serial form of the first reference to the second serializable runtime object,
(iv) emitting a serial form of the first reference in which the second serializable object is replaced with a null value,
(v) opening the second package to the one or more reflective operations,
(vi) emitting, in a first serial form of the first serializable runtime object, a minimal serial form of the second serializable runtime object,
(vii) raising a runtime exception, or
(viii) raising a warning.

20. A method comprising:
identifying, by a runtime environment of a module system, a first serializable runtime object comprising a first reference to a second serializable runtime object;
determining that the first serializable runtime object is a first instantiation of a first element in a first package of the module system, wherein the first package is open to one or more reflective operations;
determining that (a) the second serializable runtime object is a second instantiation of a second element in a second package of the module system and (b) the second element is not open to the one or more reflective operations,
wherein determining that the second element is not open to the one or more reflective operations is based, at least in part, on inter-module accessibility specified by the module system; and
responsive to determining (a) and (b), and based at least in part on the first reference of the first serializable object to the second serializable runtime object, executing a remedial operation associated with the first serializable runtime object,
wherein executing the remedial operation comprises one or more of
(i) wherein the second serializable object has a concrete type different from a declared type of the first reference in the first serializable object: emitting a serial form of the second serializable object of the declared type, for inclusion in a serial form of the first serializable object to satisfy the first reference,
(ii) wherein a closest ancestor type, of the concrete type of the second serializable object, is open to the one or more reflective operations: emitting a serial form of the second serializable object of the closest ancestor type that is open to the one or more reflective operations, for inclusion in the serial form of the first serializable object to satisfy the first reference,
(iii) refraining from emitting any serial form of the first reference to the second serializable runtime object,
(iv) emitting a serial form of the first reference in which the second serializable object is replaced with a null value,
(v) opening the second package to the one or more reflective operations,
(vi) emitting, in a first serial form of the first serializable runtime object, a minimal serial form of the second serializable runtime object,
(vii) raising a runtime exception, or
(viii) raising a warning,
wherein the method is performed by at least one device comprising a hardware processor.

* * * * *

UNITED STATES PATENT AND TRADEMARK OFFICE
CERTIFICATE OF CORRECTION

PATENT NO. : 10,120,777 B1
APPLICATION NO. : 15/719857
DATED : November 6, 2018
INVENTOR(S) : Hegarty et al.

Page 1 of 1

It is certified that error appears in the above-identified patent and that said Letters Patent is hereby corrected as shown below:

In the Claims

In Column 28, Line 1, in Claim 1, delete "(a)" and insert -- (i) --, therefor.

In Column 29, Line 22, in Claim 19, delete "one or more one or more" and insert -- one or more --, therefor.

Signed and Sealed this
Twenty-ninth Day of October, 2019

Andrei Iancu
*Director of the United States Patent and Trademark Office*